Oct. 22, 1963 E. R. HADDAD 3,107,673

FILING AID

Filed Feb. 11, 1960

INVENTOR.
ELI R. HADDAD
BY
Albert A. Mahassel
Attorney

United States Patent Office 3,107,673

Patented Oct. 22, 1963

3,107,673

FILING AID

Eli R. Haddad, 381 Hamilton St., Worcester 4, Mass.

Filed Feb. 11, 1960, Ser. No. 8,028
1 Claim. (Cl. 129—1)

This invention relates to a filing aid, and, in particular, to means for facilitating the addition and removal of a file card file sheet or other type of a file record to and from a retaining member.

It is the general object of the invention to modify the construction of a file record to permit the edgewise insertion and removal of said record to and from a retaining member.

More specifically, it is one object to provide a reinforcing tab which is adapted to be applied adhesively in overlying relation to the area surrounding the usual binder hole or holes adjacent one edge of a file record and which is effective to permit quick and easy insertion of the record to a retaining member or binder at any desired location thereupon and which is removable from the binder only upon the application of substantial tension, without, however, any damage to the tab or file record, all without the necessity of unlocking or disconnecting the binder in any manner.

It is a further object to strengthen that area of a file record adjacent the binder holes so that the record is much less likely to be removed unintentionally from the binder or to be torn or damaged in that area.

It is a further object to provide means for permitting communication between a relatively rigid file record such as a file card and the usual retaining ring or rod for storing a plurality of such records while preventing unintentional removal of the record from the retaining member.

Heretofore, many different types of reinforcing tabs have been known for application to file records such as loose leaf pages and the like, one of the most common of which is the flat circular disc having an eyelet therein which is adapted to be adhesively applied to a loose leaf page with the eyelet in register with the file hole of the leaf. Such a tab is merely intended to strengthen the area surrounding the file hole and does not facilitate the application or removal of the sheet to and from a binder ring or post, this being possible only by unlocking or disconnecting the ring or post somewhere along its length.

Further, in U.S. Patent No. 919,620, there is disclosed a paper clip or fastener adapted for application to a file sheet and which comprises a metallic clip having a split ring portion, arms extending from that portion, the openings in the clip registering with the slots in the sheet, punched teeth in the ring and arms to secure the clip to the sheet, the ends of the arms being adapted to be bent back on themselves to assist in securing the clip to the sheet, and one or both of the arms being adapted to be adjusted after the insertion of the sheet in the binder to partially close one of the filing slots to prevent thereby the removal of the sheet from the binder. Such a fastener is fairly complex and expensive and requires care in its insertion and removal to and from a binder ring or post in order to prevent damage to the file sheet to which it is attached.

According to the present invention, a novel file tab has been devised which comprises a generally rectangular shaped, fairly rigid but flexible, thin flat sheet which is preferably formed of a plastic material such as acetate, although not necessarily so. A hole or eyelet is provided approximately centrally of the sheet of the general shape and size as that of the file sheet to which it is to be applied. A very narrow slot is provided from one edge of the tab and at right angles to the eyelet so as to communicate therewith and directed toward the center of that eyelet. Additionally, although not absolutely necessary to the invention, a cutout is provided at the intersection of the slot with the edge of the tab, which cutout is preferably V-shaped with the apex thereof inwardly directed toward the eyelet, although the cutout may also be square-shaped or semi-circular. The size of the cutout is relatively small as compared to that of the eyelet. To insure quick and easy removal of the tab from the binder ring, a similar cutout is provided at the opposite end of the slot and outwardly directed. This latter cutout forms one of the important features of this invention.

The tab is provided with an adhesive having a removable protective backing so that it may conveniently be applied to a file record of any type with the eyelet in the tab registering with that already provided in the file record, the dimensions of the tab being such that the slotted edge thereof will coincide with the binding edge of the file record. One such tab is applied to each binder hole of the file record. A slight flexing of the edges adjacent to the file tab slot in opposite directions will then provide an adjacent slot in the file record and will permit the tab and file record to be inserted edgewise very easily upon the binder ring without necessitating its unlocking or releasing in any manner. Since the binder ring is substantially completely enclosed by the tab, which itself is relatively rigid as compared to the file sheet, unintended removal is rendered practically impossible. To remove the file sheet and tab from the binder post, it is only necessary to grasp the sheet and give it a quick jerk outwardly from the binder ring. As the latter strikes the cutout provided at the inner end of the slot, it will quickly cause the edges along the slot to part in opposite directions to permit removal from the ring.

In those cases where the file record is of substantial thickness and is fairly rigid, it may not be absolutely necessary to apply a tab to the record, and the advantages of the invention may be achieved by providing the record itself with the slot and cutouts as above discussed adjacent the binder hole already present in the record.

Further objects and advantages will be apparent from the description to follow.

Figure 1:
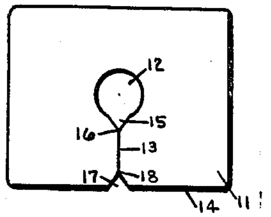
FIGURE 1 is a plan view of a preferred form of the file tab.

In FIGURE 1 the file tab is shown as comprising a generally rectangular shaped flat sheet 11 which may be comprised of any suitable fibrous or plastic material. In one preferred embodiment the tab is formed of an acetate which is fairly rigid but flexible. A thickness of about 0.010 of an inch has been found to be especially suitable for application to the usual file sheets which themselves have a thickness of about 0.004 of an inch. Approximately centrally of the tab is provided a hole or eyelet 12 which in this instance is circular. A thin slot 13 preferably only a few thousandths of an inch wide, extends from an edge 14 of the tab at right angles thereto and is directed toward the center of the eyelet. A V-shaped cutout 15 communicates with the eyelet at one end of the slot and has its apex 16 outwardly directed away from the eyelet, and a similar cutout 17 at the opposite end of the slot has its apex inwardly directed toward the eyelet. The area of each of the cutouts is relatively small as compared to that of the eyelet as noted in the drawing.

In all the illustrations shown, it should be understood that the outer of the two cutouts provided is not necessary for the purposes of the invention although the file record is rendered more easily insertable in a retaining member thereby. However, if the inner cutout were not provided, then removal of the record is possible only with relatively greater difficulty and usually not without tearing the slotted area.

Figure 2:
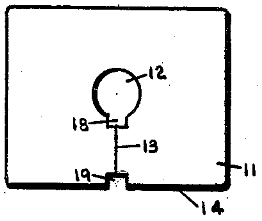
FIGURES 2 to 5 are various modifications of the tab.

In the modilcation illustrated in FIGURE 2, the tab is constructed similarly to that of FIGURE 1, with the exception that the cutouts 19 and 20 are rectangular shaped.

Figure 3:
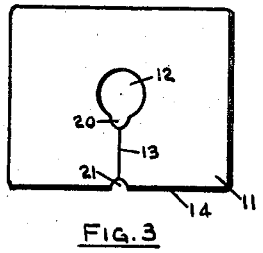

In FIGURE 3, again the tab is similar to that of FIGURE 1 except that the cutouts 20 and 21 are semi-circular. In each of FIGURES 1 to 3 the tabs are adapted for use in binders wherein the binder ring has a circular cross-section.

Figure 4:
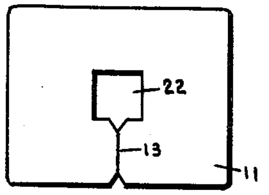

In some binders the ring cross-section is rectangular and accordingly in FIGURE 4 the tab is shown having an eyelet 22 having such a shape but otherwise is similar to that of FIGURE 1.

Figure 5:
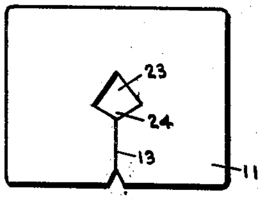

Additionally, FIGURE 5 shows a modification in which the eyelet 23 has a generally triangular shape for a still different binder ring or rod. The inner cutout 24 of this species has been enlarged so that the extremities of the two legs of the cutout each intersect one of the legs of the triangular cutout at the adjacent end thereof as illustrated.

Figure 6:
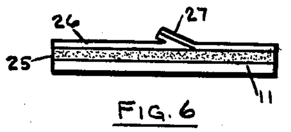
FIGURE 6 is a view of the edge of the tab with an adhesive and protective backing applied thereto.

An end view of a file tab is shown in FIGURE 6. The sheet 11 has a thin coating of an adhesive substance 25 of any suitable nature over which is applied a protective removable backing such as glassine paper. The backing may be applied in two sections which overlap at 27 to facilitate removal thereof prior to application to a file record.

Figure 7:
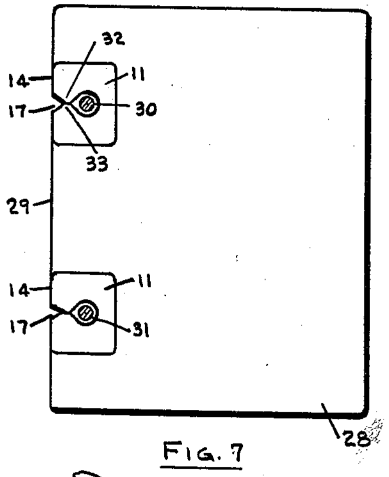
FIGURES 7 and 8 show two forms of the tab as applied to a file record.

Such a file record is shown at 28 in FIGURE 7 to which a pair of the file tabs of FIGURE 1 have been applied so that the eyelet 12 registers with each of the binder holes of the file record. The dimensions of the tab should be such that the edge 14 of the tab coincides with the binding edge 29 of the file record. The assembly is now ready to be quickly and easily inserted upon a pair of binder rings or rods, a cross-section of which is shown at 30 and 31, merely by flexing or bending the edges 32 and 33 adjacent the slot 13 in opposite directions and pushing the tab against the ring 30, or with slightly greater effort merely by pushing the cutout 17 against the ring. Removal is quickly accomplished by grasping the file record and giving a quick jerk in a direction away from the binder ring. Unintentional removal of the tab and record is practically impossible.

Figure 8:
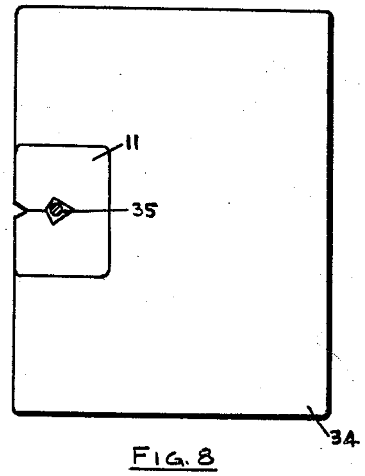

In FIGURE 8 the file record 34 is provided with a single triangular eyelet and is shown as having the tab of FIGURE 5 applied thereto in a manner similar to the tabs of FIGURE 7. Such a construction is intended for use with a single triangular shaped binder ring, a cross-section of which is shown at 35. Insertion and removal of this assembly is affected as in FIGURE 7.

Figure 9:
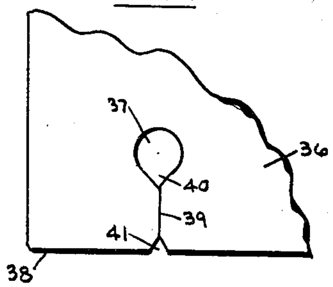
FIGURE 9 is a partial view of a file record of a relatively rigid material, illustrating how it may be modified without applying a separate tab thereto.

In FIGURE 9, a part of a file record of a relatively rigid material is shown at 36. This may be, for example, of a cardboard having a thickness of from ten to fifteen thousandths of an inch. The record is shown as provided with the usual binder eyelet or hole 37 adjacent an edge 38. A thin slot 39, similar to that shown at 13 in FIGURE 1, is provided between the eyelet and edge 38. Further, a cutout 40 is provided at the inner end of the slot to communicate with the eyelet, which cutout may be of any of the shapes shown in FIGURES 1 to 3. If desired, a further similar cutout 41 is provided at the outer end of the slot to facilitate passage of the record into the retaining member. Due to the rigidity of this type of file record, the reinforcement of a separate tab is not as necessary as in the case of less rigid file sheets. While several modifications of the invention have been shown and described, it is to be understood that other obvious modifications, such as substitutions of features of one for those of another, may be made without departing from the spirit of the invention or scope of the claim.

I claim:

A reinforcing tab for application to a single file record which comprises a flat resilient member substantially rectangular in configuration and having a single eyelet generally centrally located therein, a slot extending from an edge of said member to said eyelet and directed toward the center of said eyelet, a V-shaped cutout communicating with said edge and slot and having its apex inwardly directed, said cutout being adapted to facilitate application of said record to a retaining member, a further V-shaped cutout communicating with said eyelet and said slot and having its apex outwardly directed, said further cutout being adapted to facilitate removal of said record from a retaining member, an adhesive substance applied to one surface of said tab, and a removable backing overlying said adhesive substance.

References Cited in the file of this patent

UNITED STATES PATENTS

| | | |
|---|---|---|
| 631,127 | Razall | Aug. 15, 1899 |
| 792,747 | Anderson et al. | June 20, 1905 |
| 1,428,377 | Jewell | Sept. 5, 1922 |
| 2,274,080 | Mathews | Feb. 24, 1942 |
| 2,413,078 | Scholfield | Dec. 24, 1946 |
| 2,704,599 | Tuttle et al. | Mar. 22, 1955 |
| 2,755,576 | Golden | July 24, 1956 |
| 2,799,275 | Darden | July 16, 1957 |

FOREIGN PATENTS

| | | |
|---|---|---|
| 1,187,509 | France | Mar. 2, 1959 |